Patented Mar. 3, 1925.

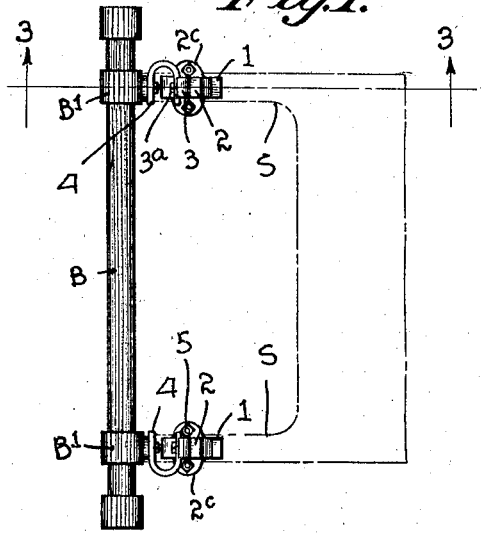
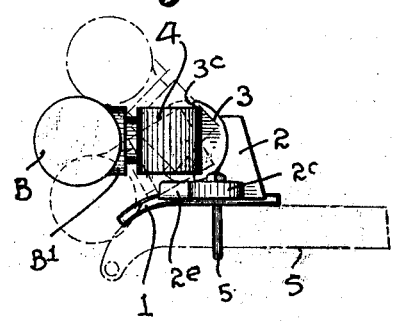
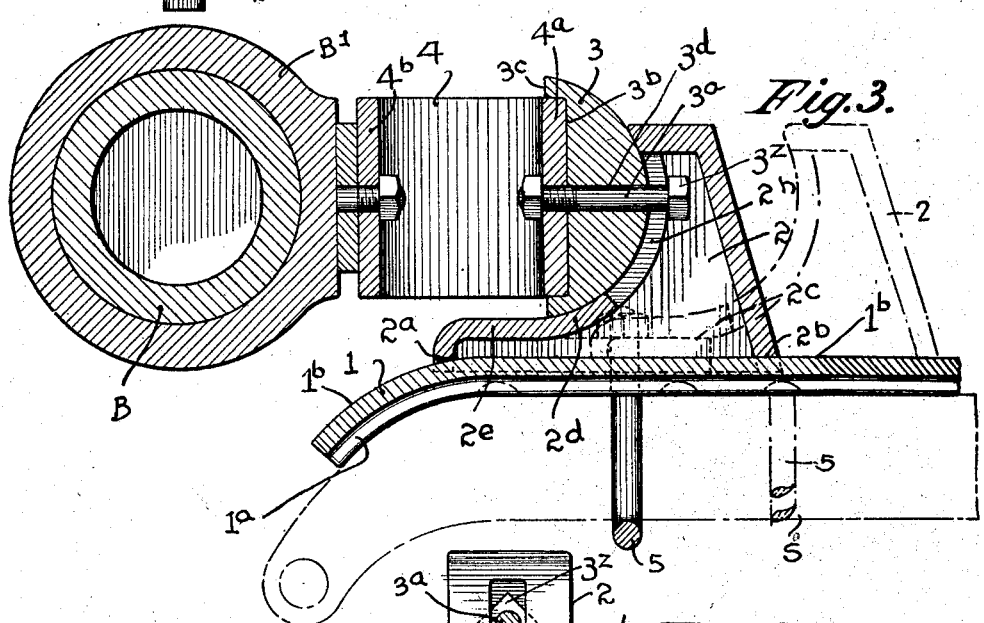
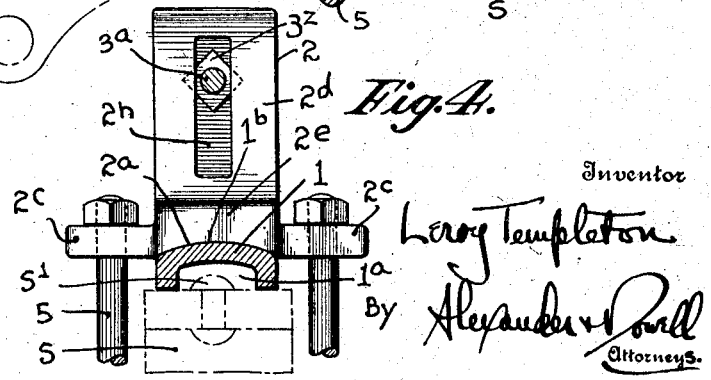

1,528,455

UNITED STATES PATENT OFFICE.

LEROY TEMPLETON, OF NORRISTOWN, PENNSYLVANIA.

BUMPER MOUNTING.

Application filed July 17, 1924. Serial No. 726,591.

*To all whom it may concern:*

Be it known that I, LEROY TEMPLETON, a citizen of the United States, residing at Norristown, in the county of Montgomery and State of Pennsylvania, have invented certain new and useful Improvements in Bumper Mountings; and I hereby declare that the following is a full, clear, and exact description thereof, reference being had to the accompanying drawings, which form part of this specification.

This invention relates to bumper mountings for automobiles, and the like, and the principal object of the invention is to provide a novel bumper mounting which is readily applicable to any type of automobiles having projecting body frame members at the front or rear of the vehicle, regardless of the type of splash pan or apron used on said vehicle.

Another object of the invention is to provide a novel bumper mounting having a universal adjustment, whereby the height of the bumper bar above the ground may be readily adjusted, and locked in position, the mounting consisting of three substantial members, and its application to the vehicle requiring no drilling of the vehicle frame, and which mounting may be readily applied over any type of splash pan or apron.

I will explain the invention with reference to the accompanying drawings which illustrate one practical embodiment thereof to enable others to adopt and use the same, and will summarize in the claims the novel features of construction, and novel combination of parts, for which protection is desired.

In said drawings:

Fig. 1 is a plan view showing a bumper applied to the frames of a vehicle by means of my novel bumper mountings.

Fig. 2 is a side elevation thereof.

Fig. 3 is an enlarged longitudinal section on the line 3—3, Fig. 1, showing in dotted lines the casting 2 in displaced position upon the bed plate.

Fig. 4 is a front partial elevation of my mounting.

As shown in the drawings, my novel mounting for each end of the vehicle comprises a pair of channel base members 1, preferably made of cast iron or steel and adapted to be placed directly upon the projecting ends of the body frames S of the vehicle, either at the front or rear of said vehicle.

If a splash pan or apron is used at the front of the vehicle, and projects outwardly upon the vehicle frames S, the base members 1 may be placed directly upon said apron or splash pan, directly over the frames S.

Each base member 1 is preferably curved longitudinally to fit the usual curvature of the body frames S of the vehicle as shown in Fig. 3, and base members 1 are preferably slightly less in width than the usual width of the frames S. Base members 1 are further channeled or concaved on their lower faces as at $1^a$ (Fig. 4), in order to allow clearance for the usual bolt or rivet heads S' of said frames S, thereby permitting the base members to straddle the bolt heads S' and to seat squarely upon the frames S, or upon the splash pan or apron directly above said frames S. Base members 1 are further provided with a convex smooth upper face $1^b$ forming a bed for the main bumper casting 2.

Each bumper casting 2 preferably comprises a hollow iron or steel casting or forging preferably closed on its sides and top but open at the bottom, said casting 2 being adapted to seat directly upon the base 1. The lower front edge $2^a$ and lower rear edge $2^b$ of the casting 2, are concaved to suit the convexity of the upper face $1^b$ of the base member 1, as shown in Figs. 3 and 4. Extending from each side of the casting 2 are lugs $2^c$ which are perforated to receive the ends of a U-bolt 5, which passes under the adjacent portion of the frame S, and which secures both the base member 1 and the casting 2 to the said frame. This method of fastening the mounting to the frame S provides for adjustability of casting 2 and permits same to be moved backward or forward upon the base member 1 until the desired position or location of casting 2 is obtained, longitudinally of the frame S. One casting 2 is provided for each base member 1, and frame S.

Moreover by reason of the fact that the upper surface of bed plate 1, and the lower surface of casting 2 are smooth, when an impact is imposed upon the bumper bar B, the casting 2 may slide longitudinally of the bed plate, as shown in dotted lines in Figure 3, and thus absorb part of said impact without injuring the vehicle frame.

The casting 2 may slide either forward or backward upon the bed plate according to whether the blow is imposed from the front or rear of said bumper. The U-bolts 5 will slide with the castings 2.

The upper portion of the front face of casting 2 or the face adjacent the bumper bar B is curved on a suitable radius as shown at $2^d$ said curved portion being adapted to receive the correspondingly curved portion of member 3, hereinafter described. The lower portion of face $2^d$ of member 2 is preferably extended as at $2^e$, as shown in the drawings.

The curved portion $2^d$ of casting 2 is provided with a vertically disposed slot $2^h$, disposed on the longitudinal axis of the member 2, said slot $2^h$ being adapted for the passage therethrough of a bolt $3^a$ which binds or locks the member 3 to the casting 2.

Member 3 comprises a semi-cylindrical block of same radius as the curvature of the face $2^d$ of casting 2, said block having a recess $3^b$ in its flat face adapted to receive a spring member 4 hereinafter described. Extending radially through the member 3, and at right angles to the flat face $3^c$ thereof is a bore $3^d$, through which the bolt $3^a$ passes binding spring 4, and member 3, to the casting 2, the head $3^z$ of said bolt engaging the inner face of the curved surface $2^d$ of casting 2, adjacent the slot $2^h$.

By the above construction, upon loosening the nut on bolt $3^a$ the member 3 carrying spring 4 and one end of bumper bar B may be vertically adjusted relative to the casting 2, to raise or lower the height of bumper bar B above the ground, and by tightening the nut on bolt $3^a$, the member 3 may be locked in said adjusted position.

Springs 4 are preferably U-shaped, as shown in Figs. 1 and 3, the outer end of one leg $4^a$ thereof engaging the groove $3^b$ in member 3, as above described, said leg $4^a$ being provided with a perforation through which the outer end of bolt $3^a$ passes. The outer end of the opposite leg $4^b$ is bolted or otherwise attached to the bumper supporting ring B′, thereby yieldingly supporting the bumper B upon the member 3.

My bumper mounting may be applied directly to the frames of any automobile without drilling, and may be readily adjusted longitudinally of the vehicle frames by adjusting bolts 5, and the height of the bumper bar above the ground may be readily adjusted by means of bolts $3^a$. My bumper mounting is applicable to any type of automobile frame regardless of the type of splasher pan used in connection therewith, and without drilling any part of the vehicle frame.

I claim:

1. A bumper mounting for vehicles having a projecting frame member, comprising a casting carrying the bumper bar, a channeled bed plate curved to conform with the shape of said frame, and means for frictionally binding the casting and bed plate to the frame member.

2. In a bumper mounting as set forth in claim 1, said bed plate having a convex upper surface; and said casting having a concave lower face adapted to seat on the upper surface of said bed plate; and said means comprising a U-bolt passing under the frame and engaging the said casting.

3. A bumper mounting for vehicles having projecting frame members, a casting carrying the bumper bar; a channeled bed plate curved to conform with the shape of the projecting ends of the vehicle frame, said bed plate having a convex upper surface; said casting having a concave lower face adapted to seat on the upper face of said bed plate; and a U-bolt passing under the frame and engaging the sides of said casting.

4. A bumper mounting for vehicles comprising a casting adapted to be mounted on the vehicle frame, said casting having a concave arcuate face provided with a radial slot; a member carrying the bumper bar, and having a convex arcuate face adapted to seat in the face of said casting; said member having a radially disposed bore therein; and a bolt passing through said slot and bore and having its head engaging the inner side of said face of said casting, whereby the angularity of the member may be adjusted relatively to the casting.

5. A bumper mounting for vehicles, comprising a casting adapted to be mounted on the vehicle frame, said casting having a concave arcuate face provided with a radial slot; a member carrying the bumper bar and having a convex arcuate face adapted to seat in the face of said casting; said member having a radially disposed bore therein adapted to register with said slot; and a bolt passing through said slot and bore and having its head engaging the under side of the face of said casting, whereby when the angularity of the member is adjusted relatively to the casing, the bolt head will travel in an arcuate path adjacent said slot.

6. A bumper mounting for vehicles having projecting frame members; comprising a casting having a concave arcuate face provided with a radial slot; a member carrying the bumper bar and having a convex arcuate face adapted to seat in the face of said casting; said member having a radially disposed bore therein; and a bolt passing through said slot and bore and having its head engaging the under side of the face of said casting; and means for frictionally binding the casting to the projecting end of the vehicle frame.

7. In a bumper mounting as set forth in claim 6, said means comprising a channeled bed plate curved to fit the vehicle frame, and having a convex upper surface; said casting having a concave lower face adapted to seat on the upper surface of said bed plate; and a U-bolt passing under the frame and engaging the sides of said casting.

8. A bumper mounting for vehicles having projecting frame members at the ends of said vehicle, comprising a casting having a horizontally disposed concave arcuate recess in one face, said face being provided with a vertically disposed slot; a semi-cylindrical member adapted to seat in the face of said casting and having a radially disposed bore therein; said member having a transversely disposed recess in its flat face; a U-shaped spring mounted at one end in said recess, the other end thereof carrying the bumper bar; and a bolt passing through said slot and bore and having its head engaging the under side of the face of said casting adjacent said slot; and means for frictionally binding the casting to the vehicle frame.

9. In a bumper mounting as set forth in claim 8, said means comprising a bed plate curved longitudinally to fit the curvature of the projecting ends of the frame of said vehicle, and channeled transversely to allow clearance for the rivet heads on said frame, said bed plate having a convex upper surface; said casting having a concave lower face adapted to seat upon the upper face of said bed plate, and a U-bolt passing under the frame and engaging the sides of said casting.

10. A bumper mounting for vehicles having projecting frame members, comprising a casting having a horizontally disposed arcuate recess in one face, said face being provided with a vertically disposed slot; a semi-cylindrical member adapted to seat in the arcuate recess and having a radially disposed bore therein; said member having a transversely disposed recess in its flat face; a U-shaped spring mounted at one end in said recess, the other end thereof carrying the bumper bar; a bolt passing through said slot and bore and having its head engaging the under side of the convex face of said casting adjacent said slot; a bed plate curved longitudinally to fit the curvature of the projecting ends of the frame members and channeled transversely to allow clearance for rivet heads; said bed plate having a convex upper surface; said casting having a concave lower face adapted to seat upon the upper face of said bed plate; and a U-bolt passing under the frame and engaging lugs on the sides of said casting.

11. A bumper mounting for vehicles having a projecting frame member, comprising a casting carrying the bumper bar; a bed plate for said casting; said casting being longitudinally slidably mounted thereon; and means for clamping the casting and bed plate on the frame member.

12. A bumper mounting for vehicles having a pair of curved projecting frame members, comprising a pair of castings carrying the bumper bar; a pair of bed plates for said castings conforming with the curvature of said frame members; said castings being longitudinally slidably mounted thereon; and means for frictionally clamping the castings and bed plates to the frame members.

13. A bumper mounting for vehicles having a pair of curved projecting frame members, comprising a pair of castings carrying the bumper bar; a pair of bed plates for said castings conforming with the curvature of said frame members; said bed plates having smooth upper surfaces and said castings being longitudinally slidably mounted thereon; and U-bolts passing under the frame members and engaging said castings for frictionally clamping the castings and bed plates to the frame members.

In testimony that I claim the foregoing as my own, I affix my signature.

LEROY TEMPLETON.